United States Patent

Sennowitz

[15] 3,665,144
[45] May 23, 1972

[54] ELECTRICAL DISCHARGE MACHINING POWER SUPPLY WITH PROTECTIVE SYSTEM FOR OUTPUT SWITCH FAILURE

[72] Inventor: Kurt H. Sennowitz, Royal Oak, Mich.
[73] Assignee: Elox, Inc., Davidson, N.C.
[22] Filed: Sept. 24, 1970
[21] Appl. No.: 74,997

Related U.S. Application Data

[63] Continuation-in-part of Ser. No. 874,574, Nov. 6, 1971, Pat. No. 3,548,142, which is a continuation-in-part of Ser. No. 699,443, Jan. 22, 1968, Pat. No. 3,524,036.

[52] U.S. Cl. .............................219/69 G, 219/69 C, 219/69 S
[51] Int. Cl. .........................................B23p 1/08, B23p 1/14
[58] Field of Search ..............................219/69 C, 69 G, 69 S

[56] References Cited

UNITED STATES PATENTS

| | | | |
|---|---|---|---|
| 3,548,142 | 12/1970 | Sennowitz | 219/69 C |
| 2,866,921 | 12/1958 | Matulaitis et al. | 219/69 S X |
| 3,257,580 | 6/1966 | Webb | 219/69 S X |
| 3,311,782 | 3/1967 | Smith et al. | 219/69 C X |
| 2,882,437 | 4/1959 | McKechnie | 219/69 G X |

Primary Examiner—R. F. Staubly
Attorney—Harry R. Dumont

[57] ABSTRACT

A protective system for an electrical discharge machining power supply circuit including a periodically operated electronic output switch or bank of output switches and a drive stage therefor. A network is connected between the output stage and the gap. Responsive to failure of one or more of the output switches and short circuiting of the gap, the remainder of output switches are biased off. Concomitantly, there is an interruption of down-feed signal in the servo control circuit causing a back-off of the servo system until the "failed" switch is replaced in the circuit.

3 Claims, 2 Drawing Figures

INVENTOR
KURT H. SENNOWITZ
BY Hauke, Gifford & Patalidis
ATTORNEYS

ELECTRICAL DISCHARGE MACHINING POWER SUPPLY WITH PROTECTIVE SYSTEM FOR OUTPUT SWITCH FAILURE

CROSS-REFERENCE TO RELATED APPLICATIONS

This application is a continuation-in-part of my co-pending Application Ser. No. 874,574, filed on Nov. 6, 1969 (now U.S. Pat. No. 3,548,142) for "Gap Short Circuit Control System for Electrical Discharge Machining Apparatus" which application in turn is a continuation-in-part of my application Ser. No. 699,443, filed on Jan. 22, 1968 for "Servo Control Circuit for Electrical Discharge Machining Apparatus," now issued as U.S. Pat. No. 3,524,036.

BACKGROUND OF THE INVENTION

The field to which my invention relates is that known as electrical discharge machining, hereinafter sometimes referred to as EDM, in which material is removed from an electrically conductive workpiece by the action of electrical gap discharges between a tool electrode and the workpiece. These discharges are provided through an electronic pulse generator in which an electronic output switch such as a semiconductor switching device is alternately triggered to turn it on and off and thus periodically connect a power source to the gap to cause passage of machining power pulses across the machining gap. An electrode or workpiece servo feed system is employed to maintain an optimum gap spacing between electrode and workpiece as metal removal progresses. A dielectric coolant such as kerosene or transformer oil or the like is circulated continuously through the gap during machining operation. A servo control circuit is required which is capable of providing a relatively constant gap and over-cut under both roughing and finishing conditions as the material is being removed from the workpiece. Back-up and down-feed are provided at appropriate times to maintain an optimum gap spacing. Related to that problem is the situation arising from gap short circuit condition when the output switch or one of the switches in the output switch bank fails with its principal electrodes in a shorted condition. This results in a continuous discharge across the gap. This continuous discharge does not permit transfer from point to point on the workpiece as is required for normal machining. The switch short circuiting can be partial or complete and can arise from internal damage, thermal runaway, high voltage transients or other circuit malfunctions. Prolongation of this condition can cause damage to both electrode and workpiece. I have found that this condition can best be alleviated by causing servo back-up and, at the same time, biasing off the remainder of the output switches so long as the failed output switch or switches remain in the circuit.

SUMMARY OF THE INVENTION

My invention provides a protective system operable in an electronic switch operated EDM power supply. By "electronic" switch, I mean any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included in this definition are electronic tubes, transistors and like devices. The output switches are biased "off" upon failure of one or more of their number. At the same time, a normal down-feed signal from the gap is inhibited to thus initiate an electrode or workpiece withdrawal from the gap which withdrawal is maintained until the failed switch is removed and replaced.

DETAILED DESCRIPTION

Figure 1:
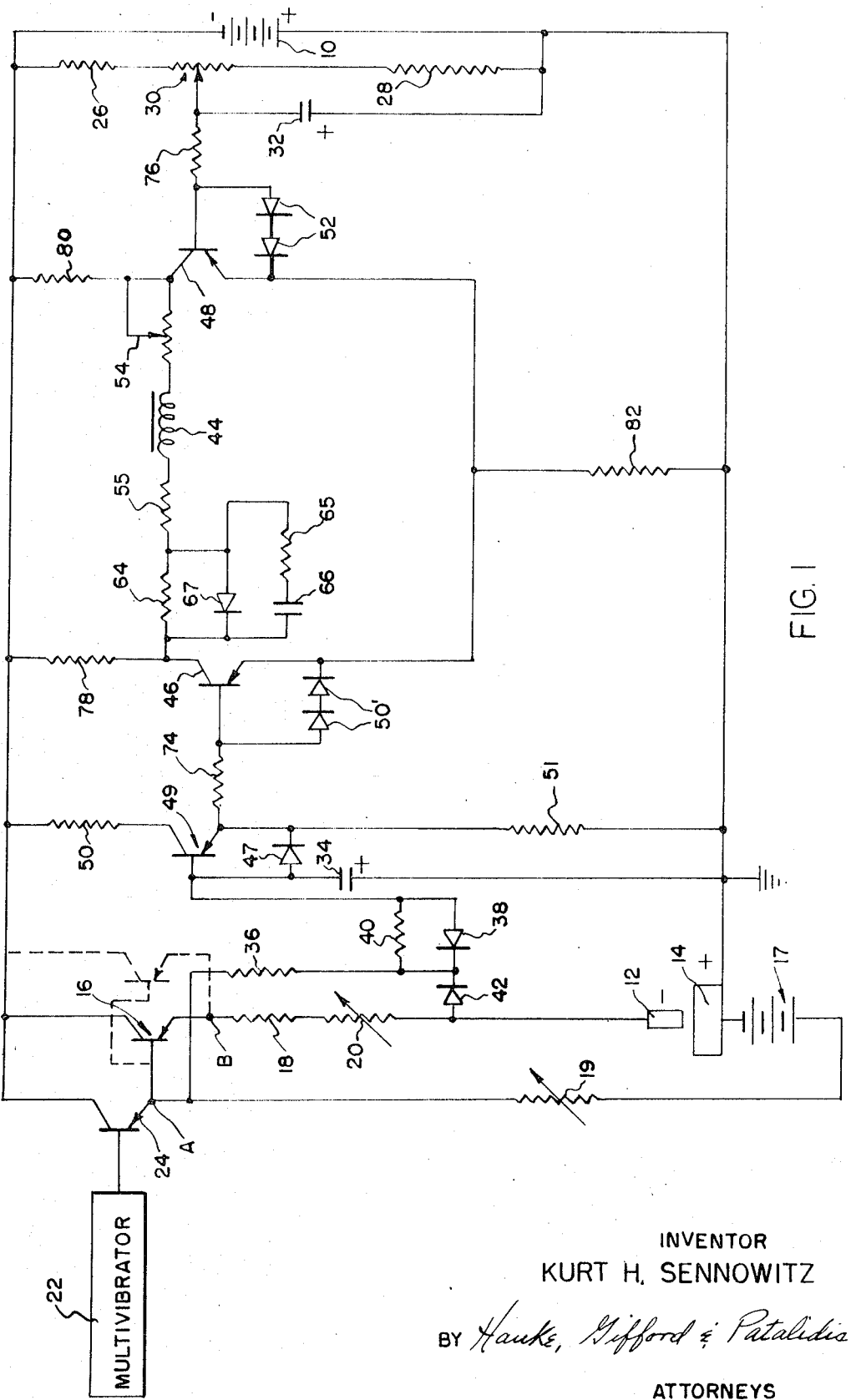
FIG. 1 is a combined schematic and diagrammatic showing of my invention.

The electrical discharge machining power supply of FIG. 1 includes a main machining power source 10. Machining power pulses are passed to a gap between a tool electrode 12 and a workpiece 14 through periodic operation of an output transistor 16 which has its power electrodes, namely, its collector and emitter in series between the power source 10 and the gap. A number of transistors 16 may be connected in parallel to provide an output bank of the required current conducting capability. The manner in which additional transistors are connected is shown in dash line representation. The output transistor 16 is normally biased "off" in the absence of triggering pulses being supplied to its base. The "off" bias is provided to the base of transistor 16 from a separate bias source 17. Bias voltage is adjustable through series rheostat 19. A fixed resistor 18 and a rheostat 20 are series connected between the emitter of the transistor 16 and the gap to provide for selective control of cutting current being passed to the gap. A pulse generator embodied as a multivibrator 22 is used to provide selectively variable on-off time, variable frequency triggering pulses, i.e., drive signals to the base of a drive stage transistor 24 which in turn operates the output transistor 16. Several types of multivibrators suitable for use in this type of electrical discharge machining power supply are shown and described in Lobur U.S. Pat. No. 3,243,567 issued on Mar. 29, 1966 and entitled "Electrical Discharge Machining Apparatus." While my invention is shown in connection with a transistorized EDM power supply, it is not so limited but may be employed in any supply where an electronic switch, as I have defined it hereinabove, is connected between a DC power source and the machining gap and periodically triggered into operation.

My servo control circuit has its reference voltage derived from a resistor network connected in shunt with the DC source 10. The reference voltage network includes a fixed resistor 26 and a fixed resistor 28 connected in series with the variable resistor of a potentiometer 30. A filter capacitor 32 is connected as shown. The control input for a differential amplifier type servo control circuit is taken from the drive signal output from the drive transistor 24 as shown. This signal is compared against the adjustable reference voltage set by the potentiometer 30 to provide down-feed and back-up of the servo feed means. Drive signal charges a capacitor 34 through a resistor 36 and a diode 38 which diode is poled as shown. The diode 38 is further shunted by a resistor 40. The connection of the drive signal sensing network is completed to the gap through a diode 42 whereby drive signal may be passed into the gap under conditions of output switch failure as will be explained hereinafter.

The direction of electrode movement is controlled by the direction of current flow through an electrically energized element, in this case an electro-magnetic servo valve coil 44 connected between the respective collectors of a transistor 46 and a transistor 48. The full detail of the hydraulic motor and servo valve used are not shown herein in the interest of simplifying this disclosure. However, a number of suitable electrohydraulic EDM servo control systems are shown and described in Webb U.S. Pat. No. 3,230,412, issued on Jan. 18, 1966, entitled "Servo Feed Apparatus for Electrical Discharge Machining." A pair of diodes 50' are connected across the base-emitter junction of the transistor 46 to protect it from excess turn-off voltage. Similarly, a pair of diodes 52 are connected across the base-emitter junction of the transistor 48. A third transistor 49 is coupled to the transistor 46 in emitter-follower arrangement with a protective diode 47 included. A pair of resistors 50 and 51 are connected in series with the emitter-collector of the transistor 49 with the magnitude of the resistor 50 being substantially lower than that of the resistor 51. The inclusion in the circuit of the transistor 49 makes possible the use of a high impedance input to the servo control circuit. During low current cutting operation, stable servo operation is assured. A rheostat 54 has its variable resistor connected between the collector of the transistor 48 and the right-hand terminal of the coil 44 to provide for adjustment for sensitivity of the servo operation. A parallel RC network is connected in series circuit between a fixed resistor 55 and the collector of transistor 46. Included in the RC network are a resistor 64, a resistor 65 and a capacitor 66. A fast back-up diode 67 is connected with the polarity shown. The resistor 65 is included in order to limit the discharge of the capacitor 66. A pair of current limiting resistors 74 and 76 are connected in circuit with the respective bases of the transistors 46 and 48. A load resistor 78 and a load resistor 80 are connected between the respective collectors of transistors 46 and 48 and the negative voltage terminal of the DC source 10 while a single resistor 82 is coupled between the positive terminal of the DC source 10 and the emitters of the transistors 46, 48.

Figure 2:
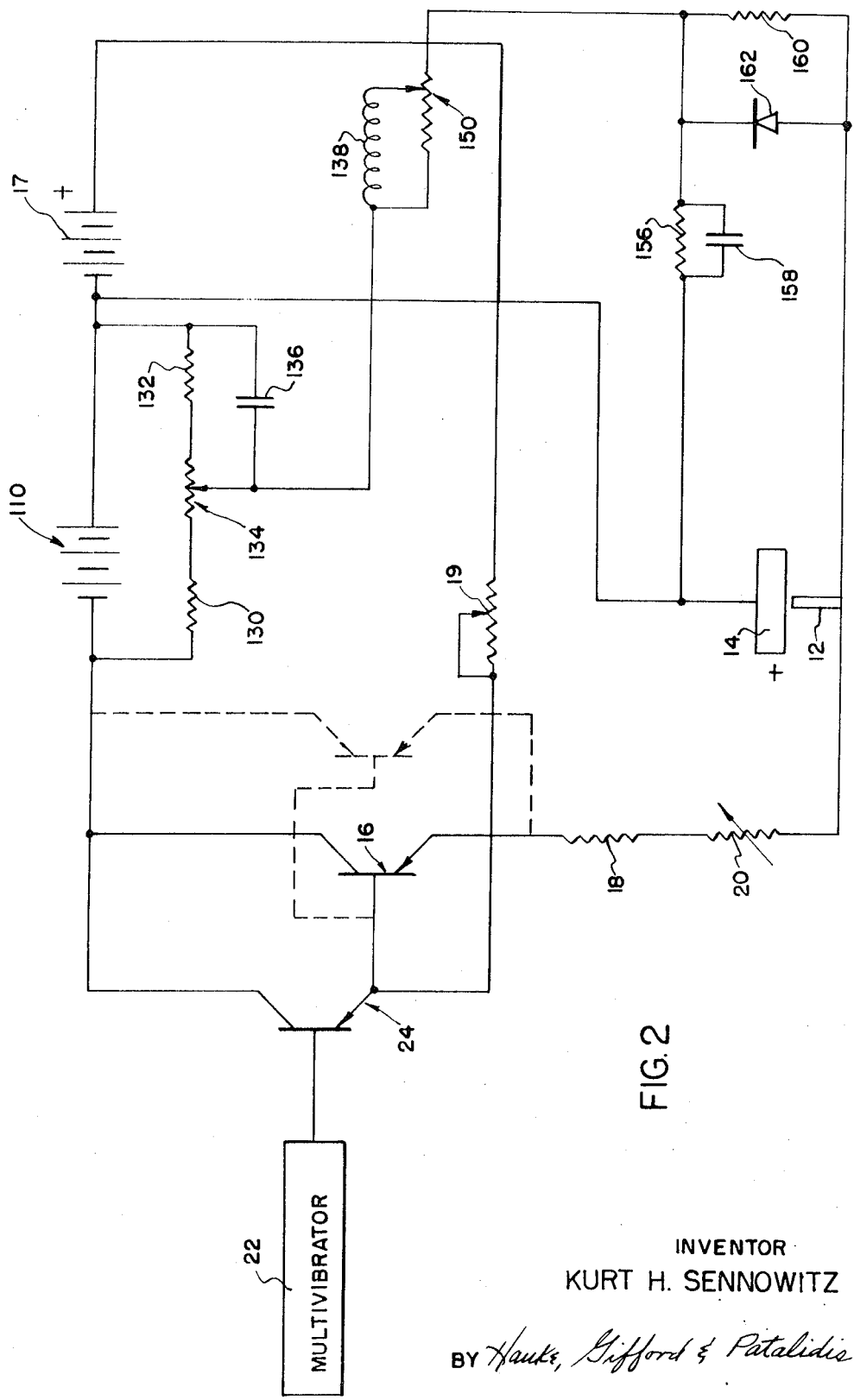
FIG. 2 is a schematic showing with a modification of the servo control portion of that circuit.

The servo control circuit of FIG. 2 similar to that of FIG. 1 includes a reference voltage source which is derived from a main machining power source 110 by means of a shunt resistor network including a pair of fixed resistors 130, 132 and the variable resistance of potentiometer 134. A filter capacitor 136 is connected as shown. The control element in the circuit is an electro-magnetic servo valve control coil 138. The direction of electrode or of workpiece movement is controlled by the direction of current flow through the coil 138. The full detail of the associated hydraulic motor and servo valve are not shown herein in the interest of simplifying this disclosure. However, a number of suitable electro-hydraulic EDM servo control systems may be used as shown in the above mentioned Webb U.S. Pat. No. 3,230,412. A potentiometer 150 is coupled as shown in parallel with the coil 138 to provide a velocity control for the servo feed. The coil 138 has its right-hand terminal operatively connected to the gap through a parallel resistor-capacitor network including a resistor 156 and a capacitor 158 with resistor 156 being of a relatively high magnitude. The parallel resistor-capacitor network is coupled to the gap to sense gap condition which in turn provides an indication of whether the output transistor 16 is operating normally to pass machining power pulses across the gap. A resistor 160 and a rectifier 162 are connected across the resistor-capacitor network and the gap as shown.

DESCRIPTION OF OPERATION

With reference to FIG. 1, when the power supply 10 and the multivibrator 22 are turned on, drive signals are passed from the transistor 24 to control the operation of the output transistor 16. Machining power pulses are provided across the gap with precisely controllable frequency and on-off time factor. At the same time, the negative drive signal is passed through the resistor 36 and the diode 38 to store on the upper plate of the capacitor 34. A portion of this drive signal will be passed to the gap through the diode 42. The negative drive signal stored on the capacitor 34 provides turn-on of the transistor 49 and subsequent turn-on of the transistor 46. Electron flow then occurs from the negative terminal of DC source 10 through the resistor 78, the collector-emitter of the transistor 46 and through resistor 82 to the positive terminal of the DC source 10. At the same time, electron flow occurs through the resistor 80, rheostat 54, in a leftward or down-feed direction through the coil 44, through the resistors 55, 64 and through the collector-emitter of transistor 46. This electron flow in a leftward direction through coil 44 causes the electrode 12 to be advanced downwardly toward the work 14. During a shorted gap, the other transistor 48 will be turned on providing inter alia an electron flow through the coil 44 in a rightward or up-feed direction to withdraw the electrode 12 and move it upwardly away from the workpiece 14 to permit the short circuit condition to be cleared. It is further significant that during a short circuit condition with excessive current flow through the gap whether the condition is caused by output transistor 16 failure or by eroded particles bridging the gap, the electrode 12 is being withdrawn from the workpiece. At the same time, by reason of the sensing network used including the resistor 36, the diode 42 and its connection to the gap, the drive signal is being virtually all passed to the positive gap terminal or ground. In the event a bank of output transistors 16 are used, bias source 17 will hold off the remainder of the transistors until the back-off occurs and the defective transistor has been replaced. This mode of operation furnishes both prompt and effective back-up and gap current limiting at the same time.

An additional feature of interest is that of the incorporation of the rheostat 54 network in series with the control coil 44. This is important for stable servo action during high frequency cutting. During normal cutting, the hydraulic control coil 44 will pass current in one direction only and hold the gap constant according to the reference voltage setting previously made on the potentiometer 30. In the circuit of FIG. 1, if the gap should short circuit, the capacitor 66 will discharge rapidly and provide fast ram back-up cutting away particles which may have been accumulated in the gap, and in breaking up the short circuit condition. This provides highly effective pulsing of the gap during up-feed or down-feed and particularly improves deep hole cutting by clearing the shortened gap more quickly thus preventing the electrode from backing out all the way.

The circuit of FIG. 2 is one which incorporates a servo back-off responsive to failure of the gap output transistor 16 or responsive to failure of the intermediate stage drive transistors 24. Following the failure of an output transistor 16, a number of related events take place:

When transistor 16 fails in a shorted condition, this causes the gap to experience an abrupt rise in passage of current thereacross.

Bias will be applied to the control electrodes of the other transistors 16 to hold them "off." The sensing network comprising RC network 156–158 as has been mentioned incorporates a very large magnitude resistor 156 so that the capacitor 158 can only pass pulsating DC during the normal operation of the output transistor. Once there has been a failure of the output transistor 16, there will be no down-feed signal available to control coil 138. The reference signal as preset by potentiometer 134 will continue to pass a back-up voltage through control coil 138 to back-up the electrode or the workpiece as the case may be, one from the other until the defective transistor 16 whether it be a single transistor or one of a bank of several transistors has been replaced.

It will thus be seen that I have provided an improved protective system for EDM in which responsive to failure of an output transistor there follows a hold-off of the other transistors in the output bank if there are more than one. My system at the same time and responsive to the same conditions provides back-up of the electrode to eliminate any possible further damage to the gap elements through excessive current flow to the gap.

I claim:

1. In an electrical discharge machining apparatus having a plurality of output electronic switches connected in parallel and periodically operated by a drive signal source to their control electrodes for providing machining power pulses from a power source across a dielectric coolant filled gap between an electrode and a workpiece, wherein the improvement comprises a protective system including a network coupled between the output from said drive signal source and said gap, said network operable to shunt said drive signal from said control electrodes of said switches responsive to a short circuit condition of said gap resulting from failure of said output switches and a DC bias source connected to the control electrode of each of said switches for holding them all off subsequent to failure of one of said switches.

2. In an electrical discharge machining apparatus having an output electronic switch bank periodically operated by a drive signal switch for providing machining power pulses from a power source across a dielectric coolant filled gap between a tool electrode and a workpiece, wherein the improvement comprises a protective system including a network having one terminal connected between the output from said drive signal switch and the control electrodes of said output switches and the other terminal connected to said gap, said network operable to shunt said drive signal from the control electrode of said output switches responsive to short circuit condition of said gap resulting from failure of said drive signal switch, and a DC bias source connected between the gap and the control electrode of said output switches for holding them "off" during failure of said drive signal switch.

3. The combination as set forth in claim 2 wherein said network comprises a series connected resistor and unidirectional current conducting device combination, said device of a polarity to pass current to said gap in said short circuit condition of said gap.

* * * * *